(12) United States Patent
Reabe (10) Patent No.: US 12,448,116 B2
(45) Date of Patent: *Oct. 21, 2025

(54) ELECTRIC SERVO DUMP GATE SYSTEM ON A CROP DUSTER

(71) Applicant: Troy Reabe, De Pere, WI (US)

(72) Inventor: Troy Reabe, De Pere, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/894,867

(22) Filed: Sep. 24, 2024

(65) Prior Publication Data

US 2025/0010981 A1 Jan. 9, 2025

Related U.S. Application Data (60) Continuation of application No. 18/236,592, filed on Aug. 22, 2023, now Pat. No. 12,122,505, which is a division of application No. 18/091,939, filed on Dec. 30, 2022, now Pat. No. 11,767,103, which is a division of application No. 16/597,468, filed on Oct. 9, 2019, now Pat. No. 11,572,156.

(60) Provisional application No. 62/743,383, filed on Oct. 9, 2018.

(51) Int. Cl.

| | | |
|---|---|---|
| *B64C 19/02* | (2006.01) | |
| *B64D 1/06* | (2006.01) | |
| *B64D 1/16* | (2006.01) | |
| *F16H 21/06* | (2006.01) | |
| *F16H 21/44* | (2006.01) | |
| *F16H 51/00* | (2006.01) | |
| *G05G 1/04* | (2006.01) | |
| *G05G 5/00* | (2006.01) | |

(52) U.S. Cl.
CPC ............... *B64C 19/02* (2013.01); *B64D 1/06* (2013.01); *B64D 1/16* (2013.01); *F16H 21/06* (2013.01); *F16H 21/44* (2013.01); *F16H 51/00* (2013.01); *G05G 1/04* (2013.01); *G05G 5/005* (2013.01); *G05G 2505/00* (2013.01)

(58) Field of Classification Search
CPC . B64D 1/16; B64D 1/18; B64D 19/02; B64D 1/06; F16H 21/06; F16H 21/44; F16H 51/00; G05G 1/04; G05G 5/005; G05G 2505/00; B64C 19/02
USPC ........................................................ 244/228
See application file for complete search history.

(56) References Cited

U.S. PATENT DOCUMENTS

| | | |
|---|---|---|
| 1,673,087 A | 6/1928 | Morse |
| 2,427,987 A | 9/1947 | Wilson |
| 2,924,040 A | 2/1960 | White et al. |

(Continued)

OTHER PUBLICATIONS

Air Repair and Kawak Aviation Technologies, Inc., "Air Repair Gate Schematics—Installation Documents", retrieved from the internet on or before Dec. 31, 2017, 128 pages (as 3 separate documents).

(Continued)

*Primary Examiner* — Joshua E Rodden
(74) *Attorney, Agent, or Firm* — Amundsen Davis, LLC (57) ABSTRACT

The present invention is an Electric servo system which controls and automates gate openings based on GPS speed and position data that results in precise and reliable modern variable and constant rate application. The Electric servo system also allows for Mechanical gate linkages to remain intact, resulting in few changes to the aircraft and redundancy of emergency components. A Mechanical input connect/disconnect is used to effortlessly transfer between the automated Electric servo system and the Mechanical gate system.

39 Claims, 4 Drawing Sheets

(56) References Cited

U.S. PATENT DOCUMENTS

| | | |
|---|---|---|
| 3,476,337 A | 11/1969 | Cornett, Jr. |
| 3,484,062 A | 12/1969 | Johnson |
| 3,777,978 A | 12/1973 | Georgescu et al. |
| 3,860,202 A | 1/1975 | Johnson |
| 3,920,184 A | 11/1975 | Waldrum |
| 4,382,568 A | 5/1983 | Schertz |
| 4,694,991 A | 9/1987 | Breckenridge |
| 5,148,989 A | 9/1992 | Skinner |
| 5,279,481 A | 1/1994 | Trotter et al. |
| 5,326,053 A | 7/1994 | Pahl et al. |
| 5,334,987 A | 8/1994 | Teach |
| 6,003,782 A | 12/1999 | Kim et al. |
| 7,044,024 B1 | 5/2006 | Younkin |
| 8,365,762 B1 | 2/2013 | Trotter |
| 8,450,998 B2 | 5/2013 | Reabe |
| 8,548,649 B2 | 10/2013 | Guyette et al. |
| 9,266,612 B2 | 2/2016 | Thompson |
| 9,346,546 B2 | 5/2016 | Markov |
| 10,196,145 B2 | 2/2019 | Thompson |
| 11,046,433 B2 | 6/2021 | Trotter |
| 11,613,357 B2 | 3/2023 | Trotter |
| 2011/0115478 A1 | 5/2011 | Reabe |
| 2012/0248248 A1 | 10/2012 | Thompson |
| 2014/0145034 A1 | 5/2014 | Thompson |
| 2019/0116719 A1 | 4/2019 | Fletcher et al. |
| 2020/0010196 A1 | 1/2020 | Trotter |
| 2020/0148358 A1 | 5/2020 | Reabe |
| 2020/0166401 A1 | 5/2020 | Reabe |
| 2021/0107630 A1 | 4/2021 | Reabe |
| 2022/0024587 A1 | 1/2022 | Trotter |

OTHER PUBLICATIONS

Allied Motion, "High-Performance Specialty Motors & Application-Specific Motion Systems" Product Overview, published on or about Aug. 29, 2017, 24 pages.

Allied Motion, "Pow-R Steer EPAS Actuator", published on Aug. 10, 2016, 2 pages.

Pictures of a Vondran Hydraulic Gate for a crop duster, and which Gate has been for sale to the public at least as early as Oct. 8, 2018, 1 page.

Transland Inc., "Meterate dispensing system for the precise aerial application of granules and seeds", published in May 1986, 4 pages.

Transland, "Mechanical Gate Box—Supplemental Type Certificate and Installation Documents", retrieved from the internet on or before Dec. 31, 2017, 48 pages.

Transland, Advertisement for 7½" Gate Manual or Hydraulic, in Oct. 2015 Ag Air Update, https://issuu.com/aau_proofs/docs/10aau_oct_e_c3a73294b7c772, p. A 18; retrieved from the internet on or around Jan. 2024 but believed to be available on the internet in Oct. 2015, 1 page.

Transland, Inc., "7 1/2" HYD Gatebox Installation Kit, AT-802", obtained by Applicant on Apr. 25, 2024 and believed to be publicly available as of 2015, 32 pages.

ELECTRIC SERVO DUMP GATE SYSTEM ON A CROP DUSTER

CROSS REFERENCE TO RELATED APPLICATIONS

This patent application is a continuation of U.S. Non-Provisional application Ser. No. 18/236,592, filed Aug. 22, 2023, and titled: ELECTRIC SERVO DUMP GATE SYSTEM ON A CROP DUSTER, which is a divisional of U.S. Non-Provisional application Ser. No. 18/091,939, filed Dec. 30, 2022, and titled: ELECTRIC SERVO DUMP GATE SYSTEM ON A CROP DUSTER, which is a divisional of U.S. Non-Provisional application Ser. No. 16/597,468, filed Oct. 9, 2019, and titled: ELECTRIC SERVO DUMP GATE SYSTEM ON A CROP DUSTER, which claims the priority to U.S. Provisional Application No. 62/743,383, filed on Oct. 9, 2018, the disclosure of which is incorporated herein by reference in its entirety.

BACKGROUND OF THE INVENTION

Field of the Invention

The present invention relates generally to a crop duster dump gate system, and more particularly to an electric servo dump gate system on a crop duster.

Description of Related Art

A crop duster dump gate opens and closes to turn on and off the flow of payload out of the hopper. The traditional Mechanical gate, standard equipment on all crop dusters, is actuated by the pilot through mechanical linkages. The effort required by the pilot to open and close the gate requires significant force that can lead to fatigue or injury. This is a reliable but feature deprived system. The pilot must constantly manually adjust for ground speed variation or accept the undesired variations of application rate and non-uniform application. This is caused by not being able to tie to the GPS and have the gate adjust for the speed and rate fluctuations.

Another system that can be installed is a Hydraulic dump gate which automates gate openings and increases precision by variable and constant rate application. On the Hydraulic system, the traditional Mechanical gate linkages and bell cranks are removed and replaced by a complex hydraulic actuator and controller that send commands to the gate. Large amounts of equipment and man hours are required to support the Hydraulic system, motor, pump, valves and more. This Hydraulic system is very expensive and can weigh more than 200 lbs. A failure on the system often results in a time-consuming installation of replacement parts before the aircraft can continue work.

Therefore, it is necessary to have a cost-effective way to obtain the benefits of technological advancements of variable rate and constant rate application, while retaining simplicity, reducing weight, reducing maintenance, and providing redundancy of emergency systems.

BRIEF SUMMARY OF THE INVENTION

Advancements in mechatronics have allowed Electric servo systems a competitive advantage over the Hydraulic system. It allows the user to automate gate openings and conduct precise and reliable variable and constant rate application. The Electric servo system is a fraction of the cost and weight, due to the reduced number of parts and miniaturization of modern electronics, Brushless motors have allowed longer part life and better power density solutions. The Electric servo system also allows for Mechanical gate linkages to remain intact, resulting in fewer changes to the aircraft and redundancy of emergency components. If there is a controller or electric servo failure, the aircraft can continue to work because the system reverts to the original mechanical linkages to open and close the gate. Replacement of a controller or electric servo is also a very quick and simple installation.

In an exemplary embodiment of the present invention, there is disclosed an electric servo dump gate system on a crop duster. The electric servo dump gate system on a crop duster includes an electric gate control system, which comprises an electric gate controller and an electric servo, wherein the gate controller upon the actuation by the pilot sends commands to the electric servo which controls the position of the gate.

In one embodiment, the electric gate control system further comprises a GPS system linked to the gate controller such that the system automates the gate opening based on real-time GPS tracking data and speed.

In one embodiment, the electric servo dump gate system further comprises a mechanical gate control system, which includes mechanical gate linkages with a lever allowing the pilot to actuate the gate.

In one embodiment, the mechanical gate control system includes a pilot's input bell crank with lever, connected to a lower bell crank by the pilot's input linkage; the lower bell crank is connected to a lower horizontal linkage, the other end of the lower horizontal linkage is connected to an over center bell crank; a mechanical pilot disconnect, connected to the over center bell crank with the other end connected to an over center linkage; the over center linkage is connected to the dump gate to open or close the gate.

In one embodiment, when the pilot's input bell crank lever is in the stowed position, the mechanical pilot disconnect is not connected, the mechanical system is not completely linked, the gate is not controlled by the mechanical control. While, when the pilot's input bell crank lever is moved out of the stored position towards the open position, re-linking the mechanical system, allowing direct mechanical control of the gate.

In one embodiment, wherein the mechanical pilot disconnect includes four parts: an input lever, an output cam, an open lug, and a spring-loaded engagement pin; wherein the spring-loaded engagement pin is configured to engage into the output cam so that when the pilot's input crank lever is moved toward an open position the engagement pin can engage to the output cam and lock the input lever to the output cam, resulting in re-link of the mechanical gate control system, and directly control the gate.

In one embodiment, wherein the electric servo is overpowered and back-driven, or there would be a clutch to disengage so the gate can be actuated manually.

In an exemplary embodiment of the present invention, there is disclosed a method of converting a traditional mechanical dump gate system to an electric servo dump gate system on a crop duster. The method comprises the following steps: installing an electric gate controller in a cockpit; disconnecting mechanical dump gate system at any location in between a pilot input bell crank and the dump gate; installing a mechanical pilot disconnect at the location where the mechanical dump gate system is disconnected; installing a back-drivable electric servo at any location near the dump gate; connecting the electric servo and the electric gate controller to the aircraft power buss through appropriate breakers; connecting the electric servo and the electric gate controller via electronics; and connecting the electric servo and the dump gate via mechanical linkages or electronic connections.

In one embodiment of the method, the location is preferably between the lower horizontal linkage and the over center bell crank.

In one embodiment, the method further comprises installing a GPS in the cockpit and adding data connection between the gate controller and the GPS to allow the GPS to feed information on ground speed variations or rate changes.

In one embodiment of the method, the mechanical pilot disconnect comprises an input lever, a spring-loaded engagement pin, an output cam, and an open lug. The spring-loaded engagement pin is configured to engage into the output cam so that when the pilot's input crank lever is moved toward an open position the engagement pin can engage to the output cam and lock the input lever to the disconnect output cam, resulting in re-link of the mechanical gate control system, and direct mechanical control of the gate. In an exemplary embodiment of the present invention, there is disclosed a dump gate system on a crop duster comprising a powered gate system; and a mechanical gate system; the powered gate system comprises a back-drivable servo, a gate controller, and a GPS; and the mechanical gate system comprises a series of cranks and linkages.

In one embodiment, the mechanical gate system further comprises a mechanical pilot disconnect that once is engaged allows bypass of the mechanical gate system, thereby the pilot can use the powered gate system; while in case of a failure of the powered gate system, the existing dump gate can be controlled by simply moving the pilot input bell crank from a stowed position towards an open position, this engages the mechanical control, the servo will go to the mode that allows it to be back-driven, thereby the pilot can continue to work until the servo system is repaired.

In one embodiment, the dump gate system further comprising an open/close switch, which can actuate the gate or the gate can tie to the GPS to automate gate openings based on stored application data, speed, and location data.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DETAILED DESCRIPTION OF THE INVENTION

As stated above, a crop duster dump gate opens and closes to turn on and off the flow of payload out of the hopper. The Electric servo system is actuated by the pilot through a gate controller, or the gate controller can be bypassed, and the gate can be manually actuated. When the pilot is using the gate controller he can have the controller linked to a GPS system and have the gate automatically adjust for changes in ground speed or application rate changes. If the electric servo fails and stops functioning, the pilot can re-connect the Mechanical gate linkages with the lever, which allows the pilot to actuate the gate and continue work. The electric servo is over-powered and back-driven, or there would be a clutch to disengage; so the gate can be actuated manually. The pilot will lose the added features provided by the GPS, but the mechanical gate control remains.

The claimed invention differs from what currently exists. The current Mechanical gate has great reliability but cannot provide automatic and modern application techniques. An expensive Hydraulic gate can be adjusted by the GPS to fully service his customers using modern technology. However, the heavy and complex control system reduces the useful load of the aircraft. To compensate for the Hydraulic system's weight and spatial requirements, the aircraft will have a reduced product capacity and other useful systems, such as the rinse tank, need to be removed from the aircraft. The complexity of the Hydraulic system introduces numerous points of failure. In the event of a failure, the problem needs to be fixed before work could continue.

The cost-effective Electric servo system can retain the reliable Mechanical gate as a secondary system and can perform modern application services by coupling to the GPS. The Electric servo system has many advantages such as weighing less, taking up less space, is less complex, and is reliable. Therefore, less changes and weight are added to the aircraft which maximizes product capacity and allows for all useful aircraft systems to be retained.

This invention is an improvement on what currently exists. The traditional Mechanical gate is unable to be controlled by the GPS to allow precision variable application of products to the crop. The Hydraulic system can connect to the GPS and allow precision variable application of products to the crop, but requires the elimination of the Mechanical system and the addition of hundreds of pounds of equipment on the aircraft. The Hydraulic system is an additional system that is required to function for the plane to work. The Electric servo system is light and simple and allows the traditional Mechanical gate to remain on the aircraft as a ready standby. This provides the best of both worlds, a GPS connect gate to allow precision variable application, while maintaining the redundancy of the traditional Mechanical gate allowing the plane to always work. There are no other systems currently able to do this.

The equipment used in the Hydraulic gate requires significant space and weight in the aircraft. It is a complex network of moving parts with pumps, accumulators, pressure sensors, control valves, hydraulic motors and the electric controller that all need to run the gate system. Aircraft systems such as the rinse tank needs to be taken off to accommodate the hydraulic gate. The invention claimed here solves this problem.

The Electric servo gate system only requires the electric controller and an electric servo motor to move the gate. The gate is still actuated by the pilot though a control interface on the controller and can directly command the electric servo to move. This system can automate gate opening based on real-time GPS tracking data and speed. From the pilot's perspective, an Electric Servo gate system can perform all the operations and functions that a Hydraulic gate can, but it requires significantly less equipment to support. The electric servo system has a simpler and less time-consuming installation, maintenance, and repair. Also, with limited components, the placement can be in more accessible locations or locations with lesser harmful chemical environments. This creates a system that is easier to access and significantly reduces the work required by the mechanic.

Figure 1:
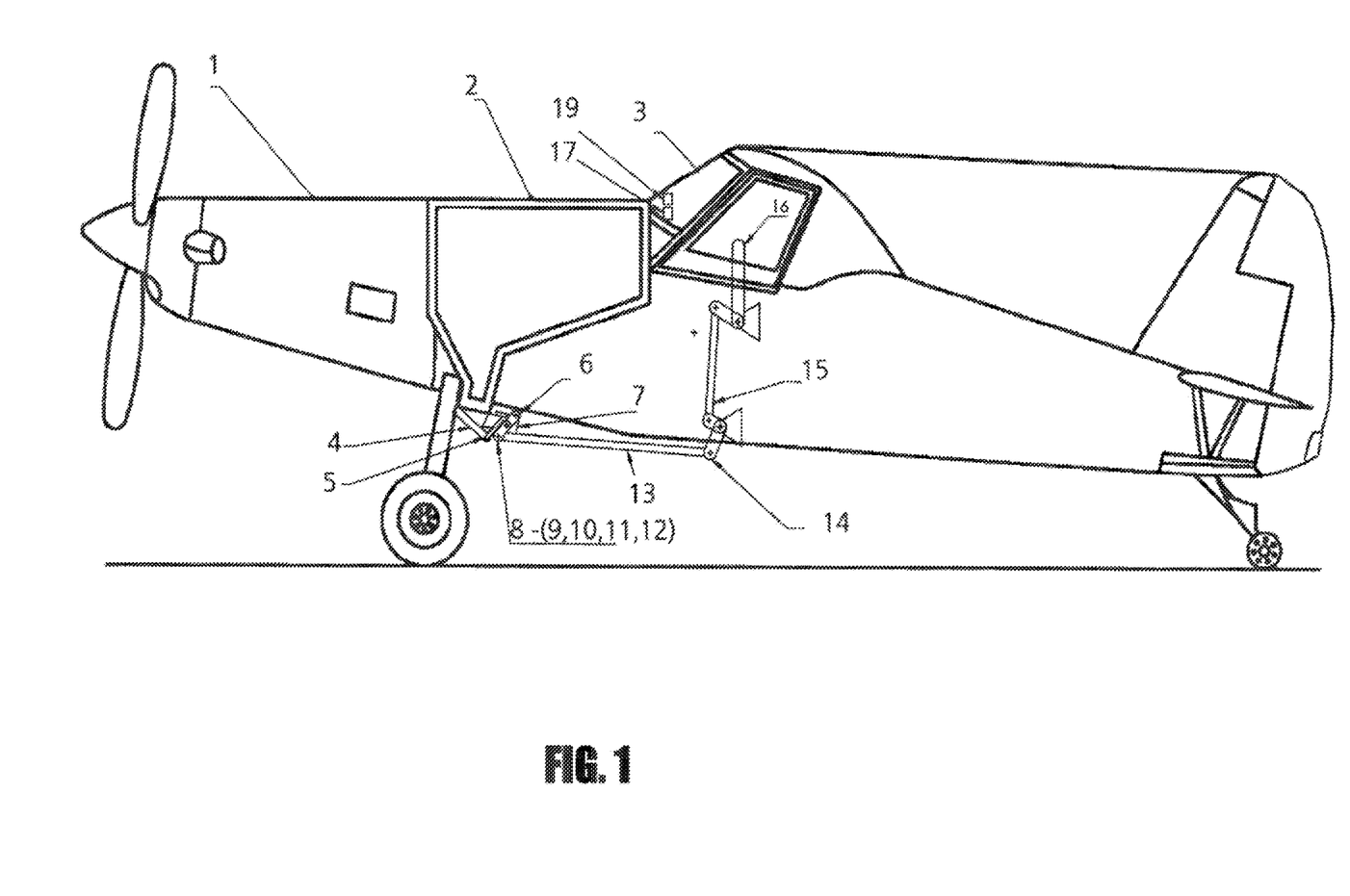
FIG. 1 is a view of an electric servo dump gate system on a crop duster in accordance with one embodiment of the present invention.

Referring to FIG. 1, there is disclosed a crop duster airplane 1 in accordance with the present invention. The crop duster airplane 1 is an aircraft that has been built or converted for agricultural use of dispensing product. The crop duster airplane 1 includes a payload hopper 2, a cockpit 3, a dump gate 4, an over-center linkage 5, an over-center bell crank 6, an Electric Servo 7, a mechanical pilot disconnect 8, a lower horizontal linkage 13, a lower bell crank 14, a linkage for pilot input 15, a pilot input bell crank 16, a gate controller 17, and a GPS 19.

The payload hopper 2 is a storage tank for holding the product. The cockpit 3 is the location inside the aircraft where the pilot sits. The dump gate 4 is the door at the bottom of the hopper used to control the release of dry product. The over-center linkage 5 is a linkage between the dump gate and over-center bell crank of the dump gate system. The over-center bell crank 6 is a bell crank for connecting the over center linkage 5 and lower horizontal linkage 13 of the dump gate system. The Electric Servo 7, with back-drive output, which is a servo that is geared or clutched to allow the output to be moved when the servo is off. The mechanical pilot disconnect 8 is a clutch, lock, shear, or pin that allows the disengagement of the pilot's side of the mechanical system from the gate side.

Figure 2:
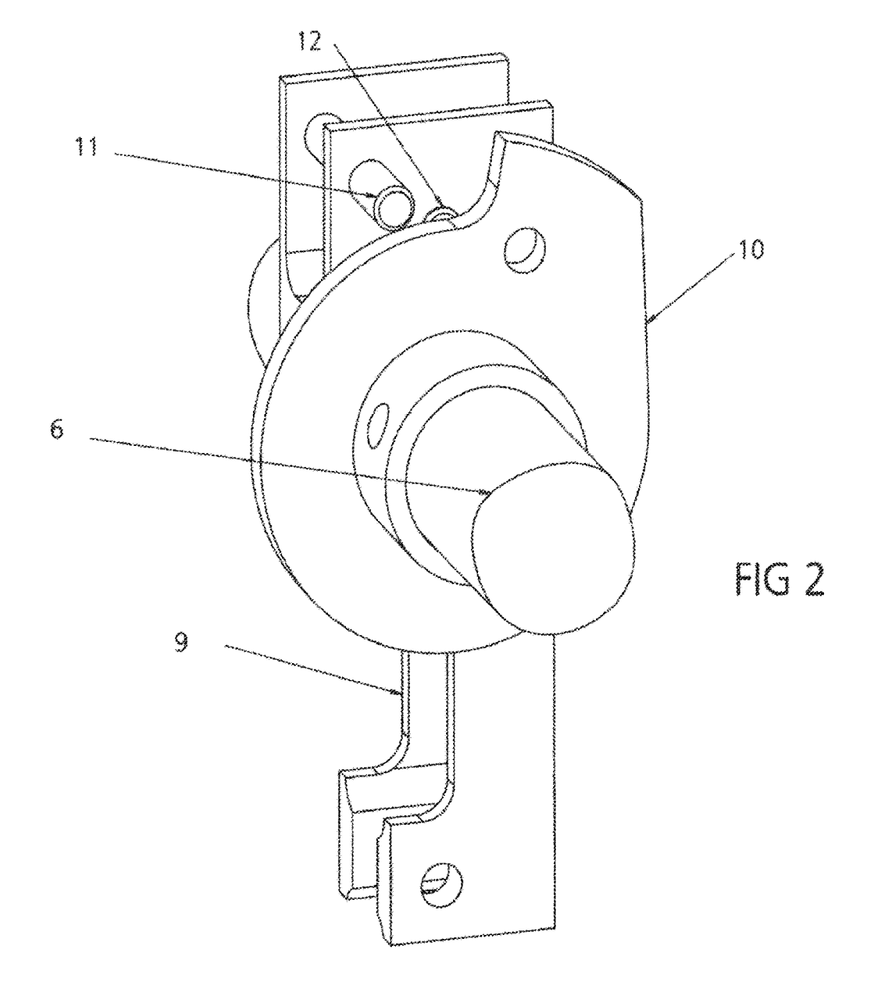
FIG. 2 is a view of a mechanical pilot disconnect in accordance with one embodiment of the present invention.

In one embodiment, the mechanical pilot disconnect 8 includes a Disconnect Input lever 9, a Disconnect Output Cam 10, and a Disconnect Open Lug 11, and a Disconnect Engagement Pin 12. The Disconnect Input Lever 9 is a lever that freely rotates on the over center bell crank 6 with the other end connected to the lower horizontal linkage 13. The Disconnect Output Cam 10 is a cam that is bolted over center bell crank 6 with a lobe that will connect with the open lug 11 and a hole for the engagement pin 12. The Disconnect Open Lug 11 is a pin or lug mounted on the Disconnect input lever 9. The lug will interfere with the Disconnect output cam 10, so the cam can never be in a more closed position than the Disconnect input lever 9. The Disconnect Engagement Pin 12 is a spring-loaded pin mounted on the Disconnect input lever 9 that when allowed will lock into the output cam 10 connecting the input lever 9 and output cam 10.

The lower horizontal linkage 13 is a linkage between the over center bell crank 6 and lower bell crank of the dump gate 4. The lower bell crank 14 is a bell crank for connecting the lower horizontal 13 and booster output linkages of the dump gate system. The Linkage for pilot input 15 is the linkage off the pilot input bell crank 16 to the lower bell crank 14. The pilot input bell crank 16 is the control lever in the cockpit used by the pilot to control the dump gate. The AG GPS 19 is an electric navigational and work tracking device, which can be used to produce locational data while retrieving or calculating crop-duster specific data such as aircraft ground speed, swath width, or desired application rate.

The mechanical control system includes the components of the system that are solely used for mechanical gate actuation.

Figure 3:
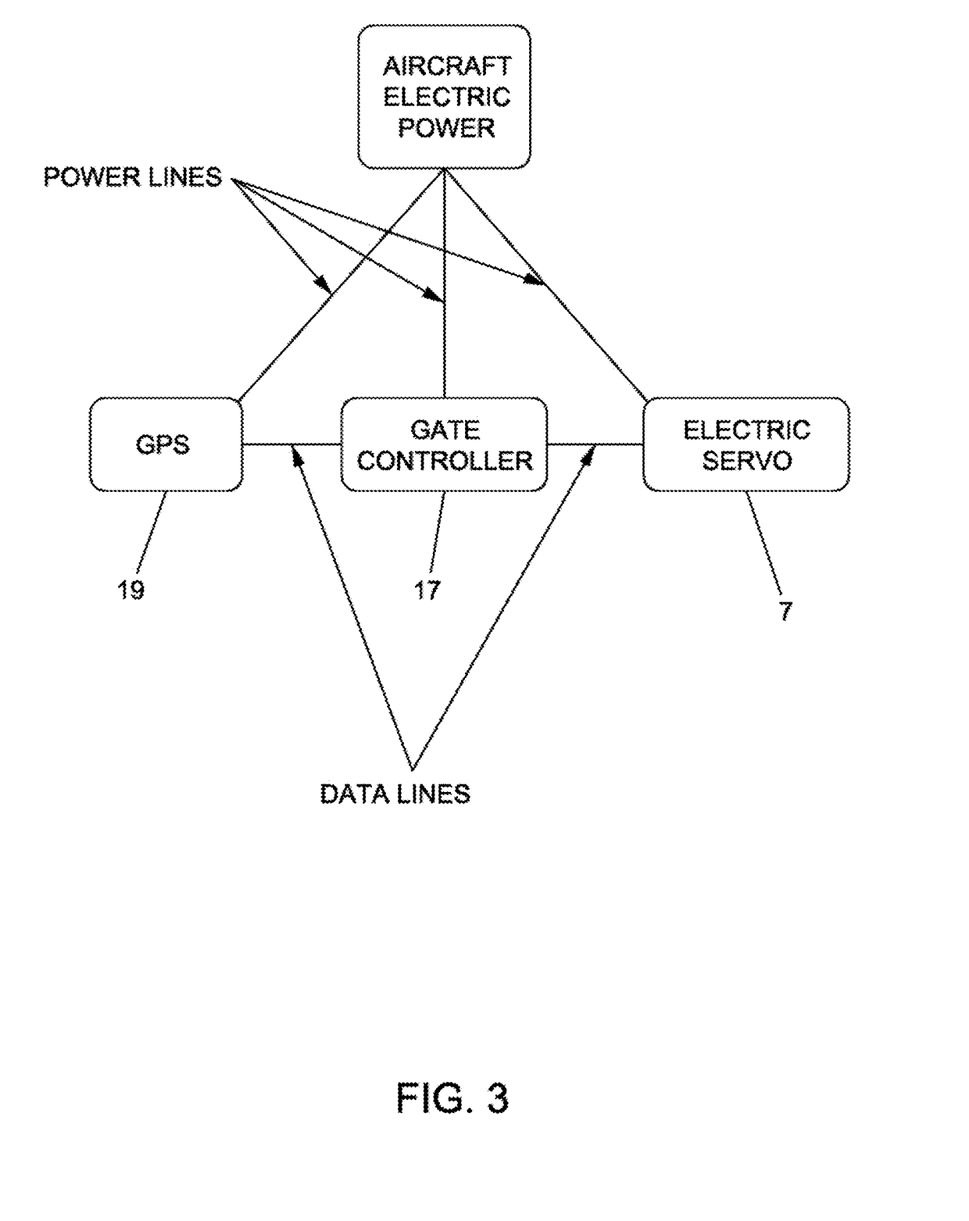
FIG. 3 is a schematic power and data lines view of the electric servo dump gate system seen in FIG. 1.
Figure 4:
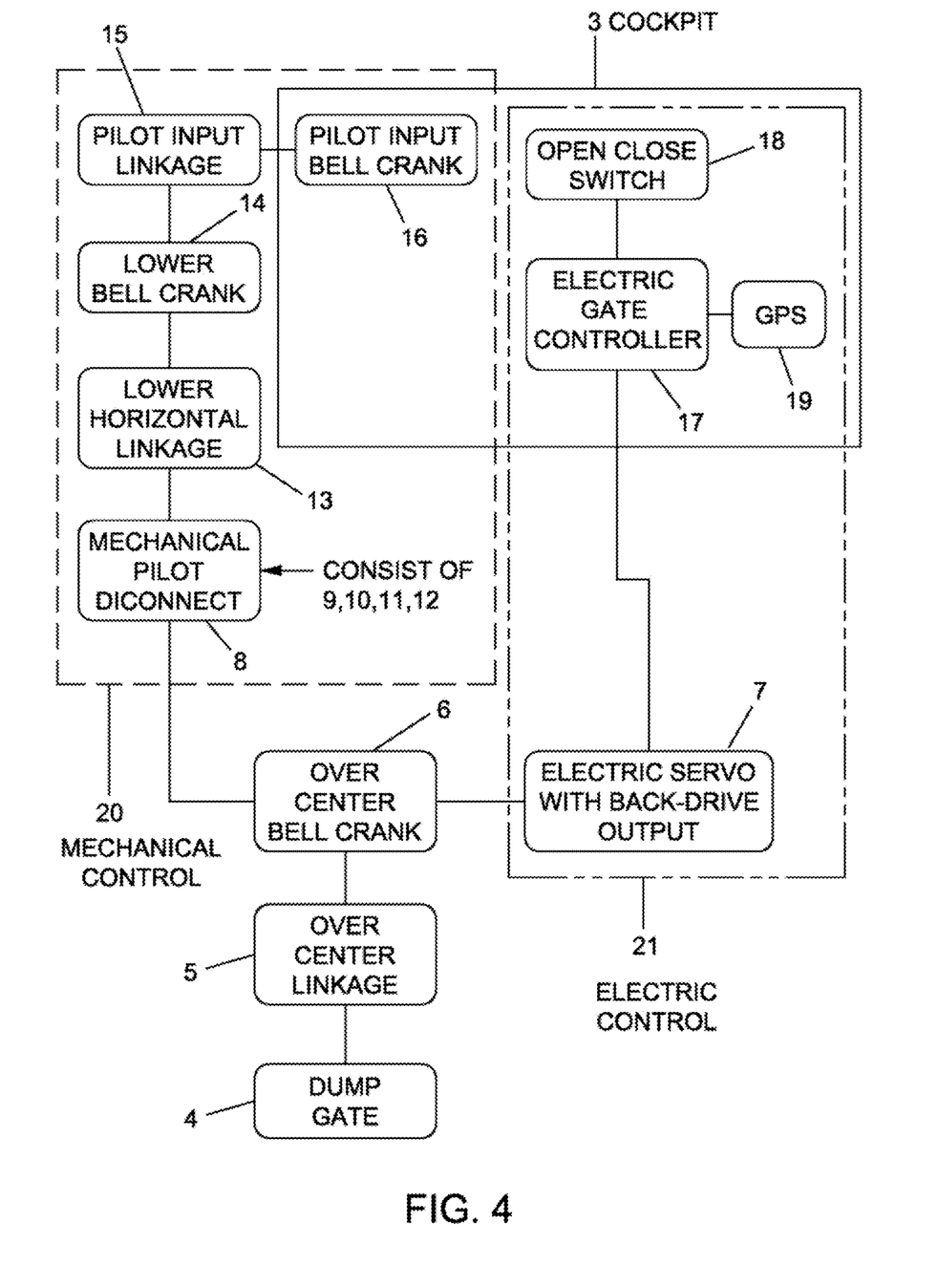
FIG. 4 is a schematic relationship view of the electric servo dump gate system seen in FIG. 1.

The electric control system includes the components of the system that are solely used for electric gate actuation, which are Gate Controller 17, Electric Servo 7, and a GPS 19. The electric control system may further include an Open/Close Switch 18, which is a two-position toggle switch connected to the Gate Controller 17 that the pilot uses to select desired gate position.

Relationship Between the Components:

Referring to FIG. 1, there is disclosed a crop duster airplane 1 in accordance with the present invention comprising a payload hopper 2, normally in the fuselage over the spar. At the bottom of the payload hopper is the dump gate 4. In the cockpit 3 is the pilot's input bell crank 16. The pilot's input bell crank 16 is connected to the lower bell crank 14 by the pilots input linkage 15. The lower bell crank is connected to the lower horizontal linkage 13. The other end of the lower horizontal linkage is connected to the over center bell crank 6. This connection is normally made through the Mechanical pilot disconnect 8, this would allow the gate to open and close while the pilot's input bell crank remains in the closed position.

Referring to FIG. 2, there is disclosed a Mechanical pilot disconnect 8 in accordance with the present invention, which is made of the following four parts. The Disconnect Input Lever 9 that is allowed to rotate on the over center bell crank with the opposite end connected to the lower horizontal linkage 13. Mounted on the disconnect input lever 9 is the spring-loaded Disconnect Engagement Pin 12 that can engage into the Disconnect Output Cam 10. If the pin is allowed to engage to the cam 10 it would lock the Disconnect Input Lever 9 to the Disconnect Output Cam 10, re-engaging the Mechanical pilot disconnect 8. The Disconnect Open Lug 11 is a pin or bump on the Disconnect Input Lever 9 that would interfere with Disconnect Output Cam 10. This interference prevents the Disconnect Output Cam 10 from ever being in a more closed position than the Disconnect Input Lever 9. Therefore, the gate can never be more closed than the pilot's input bell crank. However, if the pilot's input bell crank 16 is moved out of the stored position towards the open position the Disconnect Engagement Pin 12 aligns and locks the input lever 9 to the output cam 10, connecting the mechanical pilot disconnect 8, re-linking the mechanical system, allowing direct mechanical control of the gate. The Electric servo 7 connects to the gate controls on the gate side of the mechanical pilot disconnect 8. The over center bell crank 6 is normally where the Electric servo connects to the gate controls. The output of the over center bell crank 6 is connected to the over center linkage 5. The over center linkage 5 is then connected to the dump gate 4. All the bell crank's center pivot points are held to the crop duster via anchor points. The Gate Controller 17 is mounted in the cockpit where it is accessible for the pilot to make adjustments. The Open/Close Switch 18 is mounted in the cockpit, close to the pilot's hand, for the pilot to actuate the gate. The AG GPS 19, in the cockpit, is controlled by the pilot and can give status of the application and can dictate gate openings based on speed and position data.

The Mechanical Control 20 consist of all parts from the Mechanical Pilot Disconnect 8 to the Pilot Input Bell Crank 16. These components are only used to mechanically control the dump gate. The Electric Control 21 is composed of the electric servo 7 and all the control electronics. The electric control will not control the dump gate when the mechanical control is connected.

How the Invention Works

When the crop duster is in flight and has product in the hopper, the dump gate opens and closes, controlling the flow of the product onto the crops during application. When the mechanical pilot input is disconnected, the pilot can use the gate controller 17 to command the electric servo, which controls the position of the dump gate. The gate controller 17 can be connected to a GPS 19 to allow precision constant rate or variable rate application of products to the crop. Based on the GPS's location, the GPS 19 will give corresponding gate controller 17 application data to the gate controller 17. The gate controller 17 will then command the electric servo 7 to move gate 4 position for the proper gate settings, to achieve a specific application rate in that location.

To disconnect Pilot Input Bell Crank 16 from the dump gate 4; the Disconnect Engagement Pin 12 needs to be manually pulled and the Disconnect input lever 9 moved to the stored position, this also moves the pilot input bell crank 16 to its stored position. This disconnect operation can only be done on the ground as you must pull the Disconnect Engagement Pin 12, which is located outside the aircraft. To reconnect the mechanical pilot disconnect the operation is as simple as moving the pilot input bell crank out of its stored position towards an open gate position. As soon as the pilot input bell crank is as open as the gate, both the disconnect open lug and disconnect engagement pin engage with the disconnect output cam. The Disconnect open lug is a safety feature. If for any reason the engagement pin is unable to engage with the output cam, the open lug ensures that the pilot will always be able to mechanically open the dump gate. The engagement pin also ensures the pilot can close the dump gate using the mechanical linkages.

One key feature of the Electric Servo system is the ability to control the gate even during controller or electric servo failure. The system can simply revert back to the Mechanical system when the pilot's mechanical input is connected, then the input bell crank controls the position of the dump gate. This is done by having 2 key components, the mechanical pilot input disconnect and an electric servo, with back-drivable output. The mechanical pilot disconnect allows the pilot's input bell crank lever to remain stationary when the gate controller is in operation, but does not remove the mechanical connections of the gate through the traditional Mechanical system. This is needed so under any foreseeable failure mode there is a way for the pilot to open the dump gate and dump the load. The second component, the electric servo, is needed so the pilot can overpower and move the linkages. In a high torque gear motor servo. it takes such an excessive force to back-drive the servo that the pilot might not be able to back-drive the servo and move the gate. The solution is one of two; using a clutch on the servo output to allow the servo gearbox to be disengaged, greatly reducing the force needed to back-drive the servo output. Or preferably a higher torque motor can be used that is geared to reduce the force required to back-drive the motor to an acceptable level when you have a system that can work both by an electric servo or mechanical linkages you maintain ultimate reliability while utilizing GPS to perform modern advanced service capabilities the customers require.

How to Make the Invention

Assemble the system on the aircraft as described in the earlier sections.

Install the Gate Controller in the cockpit.

Install the Back-Drivable Electric Servo 7 connected to the over-center bell crank 6 and the aircraft payload hopper 2.

Disconnect the Lower horizontal linkage 13 from the over center bell crank 6.

Install the Mechanical Pilot Disconnect 8 between the over center bell crank 6 and the lower horizontal linkage 13.

Connect the Electric Servo 7 and Gate Controller 17 to the aircraft power buss through appropriate breakers. Connect the data lines between the Electric Servo 7 and Gate Controller 17. Data lines can also be connected from the Gate Controller 17 to the GPS 19, if desired. Once the installation is complete, energize the circuit breakers and the system will power on and start working.

You may add a data connection to the GPS to allow the GPS to feed info on ground speed variations or rate changes.

The Mechanical pilot disconnect 8 can be located anywhere in between the pilot input bell crank 16 and the dump gate 4. However, it is preferable for the Mechanical pilot disconnect 8 to be closer to the dump gate 4 to limit the inertia in the servo-controlled system. The Electric servo 7 can be located anywhere in between the Mechanical pilot disconnect 8 and the dump gate 4.

How to Use the Invention

First, install all the components into your aircraft, connect all the components, and power the unit. When the Mechanical Pilot Disconnect 8 is engaged and the Mechanical system is bypassed, the pilot can use the electric gate controller 17. The simple "open close switch" can actuate the gate or the gate can tie to the GPS to automate gate openings based on stored application data, speed, and location data.

By pressing the "Set Position" button on the face of the electric gate controller, the unit will require a position opening to be entered; the desired position may be in percentage of gate opening or inches of gate opening. The gate will open to the set position when the "open/close switch" is moved to the open position. If the "open close switch" is moved to the close position the gate will close.

By pressing the "Constant" button on the face of the controller the unit will enter constant rate mode. The desired position and desired ground speed are entered into the electric gate controller. The controller will constantly calculate an open position based upon the desired gate position, desired ground speed, and actual ground speed.

The equation is:

Open Position=Desired Position×(Actual Ground Speed÷Desired Ground Speed)²

The gate will open to the calculated 'open position' when the "open/close switch" is moved to the open position; the gate will constantly adjust to the appropriate open position at any given time based on the actual ground speed. If the "open/close switch" is moved to the close position the gate will close. This function describes constant rate mode.

By pressing the "Variable" button on the face of the controller the unit will enter variable rate mode. This mode relies on the GPS to be loaded with application data that details specific coverage rates in different field locations. The desired gate position is now constantly sent from the GPS, determined by the coverage rates, to the gate controller based on the actual aircraft location. As before, the controller will constantly calculate an open position based on the desired gate position, desired ground speed, and actual ground speed. The gate will open to the calculated 'open position' when the "open/close switch" is moved to the open position. The gate will constantly adjust to the new open position. If the "open/close switch" is moved to the close position the gate will close.

Additionally, in the case of a failure of the Electric Gate System, the existing dump gate bell crank can be used to control the dump gate by simply moving the pilot input bell crank from the stowed position towards the open position. This engages the Mechanical Control. The electric servo will go to the mode that allows it to be back-driven. In this way the pilot can continue to work until the Electric Servo System is repaired.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

Any modification made to the friction wrench including fundamental novel features of this invention are within the scope of the invention when interpreted in accordance with the breadth to which they are entitled.

What is claimed is:

1. A dump gate system on a crop duster with a dump gate comprising:
   a powered gate system connectable to the dump gate, the powered gate system comprising a servo and a series of mechanical components that connect the servo to the dump gate to actuate the dump gate;
   a mechanical gate system with disconnect connectable to the dump gate, the mechanical gate system with disconnect comprising a series of cranks and linkages, a pilot input bell crank, and a mechanical pilot disconnect, wherein the mechanical gate system with disconnect is capable of being connected to the servo; and,
   the mechanical pilot disconnect capable of providing continuous mechanical connection from the pilot input bell crank to the dump gate to enable the dump gate system to work manually by just insertion of a pin to the mechanical pilot disconnect.

2. The dump gate system of claim 1, wherein just insertion of the pin to the mechanical pilot disconnect thereby enables a pilot to manually open and close the dump gate by at least one member in the group comprising the powered gate system and the mechanical gate system.

3. The dump gate system of claim 1, wherein the mechanical gate system is capable of enabling a pilot to manually open and close the dump gate with just insertion of the pin.

4. The dump gate system of claim 1, wherein just insertion of the pin reconnects the mechanical gate system enabling a pilot to manually open the dump gate to an extent that the dump gate opens in order to continue to work the dump gate.

5. The dump gate system of claim 4, further comprising the dump gate capable of being manually opened to the extent that the dump gate opens while using a back-drivable motor.

6. The dump gate system of claim 5, further comprising the dump gate capable of being manually opened to the extent that the dump gate opens including a force to open the dump gate being reduced by a high torque motor geared to reduce the force to back-drive the back-drivable motor.

7. The dump gate system of claim 1, wherein the pin is a spring loaded pin.

8. The dump gate system of claim 1, wherein the servo is an electric servo.

9. The dump gate system of claim 1, wherein the servo is an back-drivable electric servo.

10. The dump gate system of claim 1, further providing the dump gate system with an open/close switch which actuates the dump gate or ties to a GPS to automate dump gate openings based on stored application data, speed, and location data.

11. The dump gate system of claim 1, wherein the powered gate system comprises the servo, an electric gate controller, and a GPS; and, wherein the servo is a back-drivable servo.

12. The dump gate system of claim 1, wherein all the mechanical components of the powered gate system are necessary for the dump gate system to provide continuous mechanical connection to the dump gate to enable the dump gate system to continue to work in case of a failure of the powered gate system, and continually uses these mechanical components providing redundancy of an emergency system when powered operation of the dump gate system occurs.

13. The dump gate system of claim 12, wherein the series of mechanical components of the powered gate system are continually being used while the powered gate system is in operation and this provides a continual check of the emergency system because same mechanical components to actuate the dump gate manually are used in the powered gate system and the mechanical gate system.

14. The dump gate system of claim 1, further comprising a switch which actuates the dump gate in a powered operation mode and in a mechanical operation mode.

15. The dump gate system of claim 1, further comprising a gate controller which actuates the dump gate in a powered operation mode and in a mechanical operation mode.

16. A dump gate system on a crop duster comprising:
a powered gate system and a mechanical gate system with disconnect, wherein the powered gate system comprises a series of mechanical components and servo that operate to open and close a dump gate;
the mechanical gate system with disconnect comprising a series of connected components including cranks, linkages and a mechanical pilot disconnect, wherein the powered gate system and the mechanical gate system with disconnect are connected together via the mechanical pilot disconnect; and, the mechanical components and the servo of the powered gate system are capable of providing continuous mechanical connection to the dump gate and are also components used for the dump gate system to continue to work manually upon just insertion of a pin to the mechanical pilot disconnect of the mechanical gate system.

17. The dump gate system of claim 16, wherein just insertion of the pin to the mechanical pilot disconnect thereby enables a pilot to manually open and close the dump gate by at least one member in the group comprising the powered gate system and the mechanical gate system.

18. The dump gate system of claim 16, wherein the mechanical gate system is capable of enabling a pilot to manually open and close the dump gate with just insertion of the pin.

19. The dump gate system of claim 16, wherein just insertion of the pin reconnects the mechanical gate system enabling a pilot to manually open the dump gate to an extent that the dump gate opens in order to continue to work the dump gate.

20. The dump gate system of claim 19, further comprising the dump gate capable of being manually opened to the extent that the dump gate opens while using a back-drivable motor.

21. The dump gate system of claim 20, further comprising the dump gate capable of being manually opened to the extent that the dump gate opens including a force to open the dump gate being reduced by a high torque motor geared to reduce the force to back-drive the back-drivable motor.

22. The dump gate system of claim 16, wherein the pin is a spring loaded pin.

23. The dump gate system of claim 16, wherein the servo is an electric servo.

24. The dump gate system of claim 16, wherein the servo is an back-drivable electric servo.

25. The dump gate system of claim 16, further providing the dump gate system with an open/close switch which actuates the dump gate or ties to a GPS to automate dump gate openings based on stored application data, speed, and location data.

26. The dump gate system of claim 16, wherein the powered gate system comprises the servo, an electric gate controller, and a GPS; and, wherein the servo is a back-drivable servo.

27. The dump gate system of claim 16, wherein all the mechanical components of the powered gate system are necessary for the dump gate system to provide continuous mechanical connection to the dump gate to enable the dump gate system to continue to work in case of a failure of the powered gate system, and continually uses these mechanical components providing redundancy of an emergency system when powered operation of the dump gate system occurs.

28. The dump gate system of claim 27, wherein the series of mechanical components of the powered gate system are continually being used while the powered gate system is in operation and this provides a continual check of the emergency system because same mechanical components to actuate the dump gate manually are used in the powered gate system and the mechanical gate system.

29. The dump gate system of claim 16, further comprising a switch which actuates the dump gate in a powered operation mode and in a mechanical operation mode.

30. The dump gate system of claim 16, further comprising a gate controller which actuates the dump gate in a powered operation mode and in a mechanical operation mode.

31. A dump gate system on a crop duster with a powered gate system and a mechanical gate system comprising:
the powered gate system comprising mechanical components, a servo, and a series of components that connect the servo to a dump gate;
the mechanical gate system connected to the servo wherein the mechanical gate system comprises a series of connected components including a pilot input bell crank, cranks and linkages; and,
direct mechanical connection among the mechanical gate system with the mechanical components and the servo of the powered gate system from the pilot input bell crank to the dump gate, thereby enabling the dump gate system to provide continuous mechanical connection to the dump gate to enable the dump gate system to continue to work by actuation of the dump gate by at least one member in the group comprising the powered gate system and the mechanical gate system.

32. The dump gate system of claim 31, wherein the servo is an electric servo.

33. The dump gate system of claim 31, wherein the servo is an back-drivable electric servo.

34. The dump gate system of claim 31, further providing the dump gate system with an open/close switch which actuates the dump gate or ties to a GPS to automate dump gate openings based on stored application data, speed, and location data.

35. The dump gate system of claim 31, wherein the powered gate system comprises the servo, an electric gate controller, and a GPS; and, wherein the servo is a back-drivable servo.

36. The dump gate system of claim 31, wherein all the mechanical components of the powered gate system are necessary for the dump gate system to provide continuous mechanical connection to the dump gate to enable the dump gate system to continue to work in case of a failure of the powered gate system, and continually uses these mechanical components providing redundancy of an emergency system when powered operation of the dump gate system occurs.

37. The dump gate system of claim 36, wherein the mechanical components of the powered gate system are continually being used while the powered gate system is in operation and this provides a continual check of the emergency system because same mechanical components to actuate the dump gate manually are used in the powered gate system and the mechanical gate system.

38. The dump gate system of claim 31, further comprising a switch which actuates the dump gate in a powered operation mode and in a mechanical operation mode.

39. The dump gate system of claim 31, further comprising a gate controller which actuates the dump gate in a powered operation mode and in a mechanical operation mode.

* * * * *